(12) United States Patent
Morel et al.

(10) Patent No.: US 9,413,015 B2
(45) Date of Patent: Aug. 9, 2016

(54) NON-DESTRUCTIVE METHOD FOR TESTING THE SEAL OF AN ELECTROLYTE OF AN ELECTROCHEMICAL CELL

(75) Inventors: Bertrand Morel, Saint Martin le Vinoux (FR); Jacques Pocachard, Voreppe (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 13/641,998

(22) PCT Filed: Apr. 28, 2011

(86) PCT No.: PCT/FR2011/050967
§ 371 (c)(1),
(2), (4) Date: Oct. 18, 2012

(87) PCT Pub. No.: WO2011/135263
PCT Pub. Date: Nov. 3, 2011

(65) Prior Publication Data
US 2013/0061661 A1    Mar. 14, 2013

(30) Foreign Application Priority Data
Apr. 28, 2010    (FR) .................... 10 53236

(51) Int. Cl.
*G01M 3/04*    (2006.01)
*H01M 6/50*    (2006.01)
(Continued)

(52) U.S. Cl.
CPC ........ *H01M 6/5083* (2013.01); *H01M 10/4285* (2013.01); *H01M 8/00* (2013.01)

(58) Field of Classification Search
CPC ....... C25B 15/02; C25B 9/20; H01M 8/0297; H01M 12/06; Y02E 60/50; G01M 3/38; G01M 3/025; G01M 3/12; G01M 3/202; G01M 3/226; G01M 3/228; G01M 3/3254; G01M 3/00; G01M 3/002; G01M 3/022; G01M 3/042; G01M 3/186; A61K 2300/00; A61K 45/06; A61K 31/337; A61K 31/70; A61B 18/04; A61B 5/01; A61B 17/0057
USPC ............. 73/40.7, 45, 52, 53.01, 53.04, 53.06, 73/54.07, 54.38, 823, 49.3
See application file for complete search history.

(56) References Cited

U.S. PATENT DOCUMENTS 3,529,463 A    9/1970    Orlando et al.
4,099,404 A    7/1978    Eberle
(Continued)

FOREIGN PATENT DOCUMENTS

EP    0 827 226 A2    3/1998
EP    1 522 838 A2    4/2005
WO    WO 2004/027369 A2    4/2004

OTHER PUBLICATIONS

International Search Report issued Jul. 27, 2011 in Application No. PCT/FR2011/050967.

*Primary Examiner* — Eric S McCall
*Assistant Examiner* — Mohammed E Keramet-Amircola
(74) *Attorney, Agent, or Firm* — Oblon, McClelland, Maier & Neustadt, L.L.P.

(57) ABSTRACT

A method for testing a seal of a part that includes an electrolyte of an electrochemical cell, the method including: forming a closed cavity delimited by a first outer surface of the part including the electrolyte to be tested; contacting a second outer surface of the part, opposite the first surface, with a first fluid; circulating a second fluid, separate from the first fluid, through the closed cavity between an inlet and an outlet of this cavity; and analyzing the fluid extracted via the outlet of the cavity, to detect possible presence of the first fluid.

12 Claims, 1 Drawing Sheet

(51) Int. Cl.
*H01M 10/42* (2006.01)
*H01M 8/00* (2016.01)

(56) References Cited

U.S. PATENT DOCUMENTS

| | | | |
|---|---|---|---|
| 4,282,744 A * | 8/1981 | Dick | 73/49.3 |
| 4,824,739 A * | 4/1989 | Breault et al. | 429/469 |
| 5,427,658 A * | 6/1995 | Allen | 205/556 |
| 5,602,328 A | 2/1997 | Palmer | |
| 6,196,056 B1 * | 3/2001 | Ewing et al. | 73/40.7 |
| 6,314,796 B1 * | 11/2001 | Wittekind et al. | 73/49.2 |
| 7,651,814 B2 * | 1/2010 | Anderson et al. | 429/175 |
| 2004/0151953 A1 * | 8/2004 | Kirk et al. | 429/12 |
| 2005/0079620 A1 * | 4/2005 | Eberhard et al. | 436/1 |
| 2005/0221145 A1 * | 10/2005 | Leonida et al. | 429/34 |
| 2005/0263393 A1 * | 12/2005 | Paz | 204/400 |
| 2014/0291165 A1 | 10/2014 | Morel | |

* cited by examiner

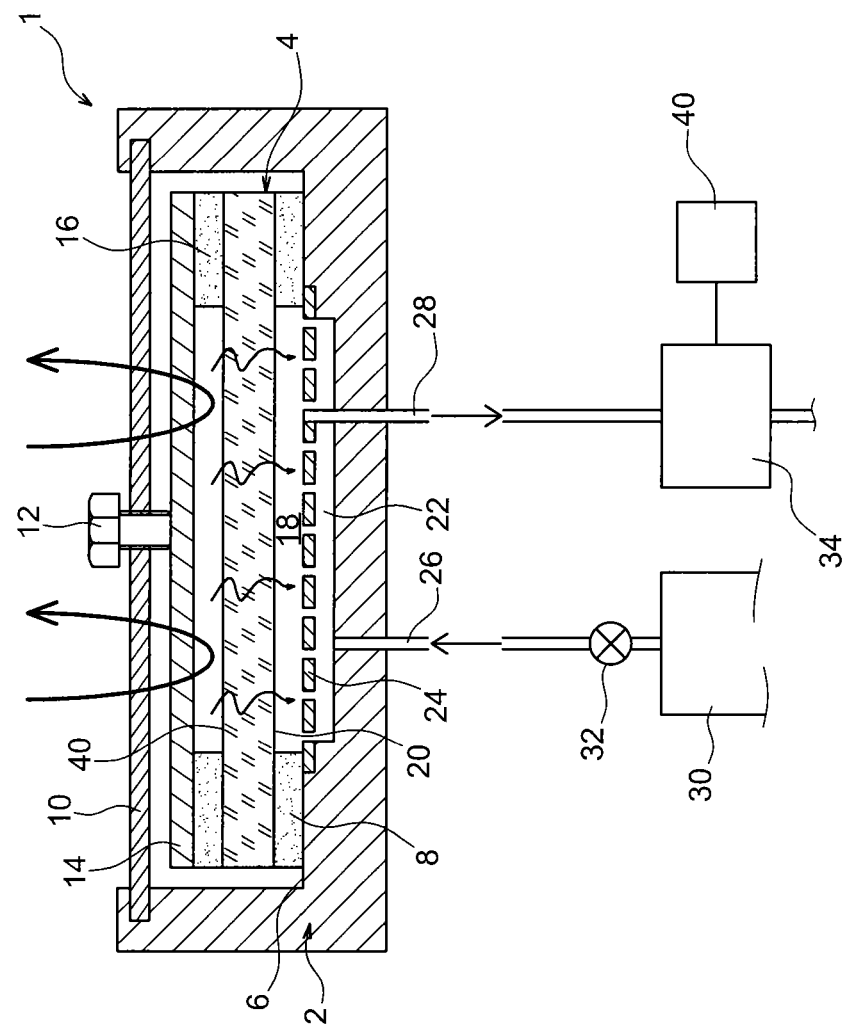

NON-DESTRUCTIVE METHOD FOR TESTING THE SEAL OF AN ELECTROLYTE OF AN ELECTROCHEMICAL CELL

TECHNICAL FIELD

The present invention is related to the field of electrochemical cells, of the type comprising an electrolyte contained between an anode and a cathode.

These electrochemical cells are conventionally used in fuel cells, for example of SOFC type (Solid Oxide Fuel Cell) or DMFC type (Direct Methanol Fuel Cell), and in electrolytic cells e.g. of SOEC type (Solid Oxide Electrolysis Cell).

STATE OF THE PRIOR ART

The electrolyte of an electrochemical cell must be as hermetic as possible against fuel gases/liquids and oxidizer fed to the cathode and anode, in order to limit reactions between the latter which would reduce cell performance levels.

The sealing of the electrolyte of an electrochemical cell is therefore often tested before use to detect the presence of any sealing defects on the electrolyte which, when in operation, would lead to a drop in yield of the fuel cell or of the electrolysis cell. Usually these defects are in the form of cracks accidentally occurring during the manufacture of the electrolyte.

From the prior art, different seal tests are known which have in common the disadvantage that they use very high gas pressures which place large stresses on the cell being tested, sometimes even causing the rupture thereof. In addition, the implementing of these tests very often proves to be complicated.

DESCRIPTION OF THE INVENTION

The object of the invention is therefore at least partly to overcome the above-mentioned disadvantages in connection with prior art embodiments.

For this purpose, the subject of the invention is a method for testing the imperviousness of a part comprising an electrolyte of an electrochemical cell, the method comprising the following steps:

forming a closed cavity delimited by a first outer surface of the part comprising the electrolyte to be tested;

contacting a second outer surface of the part, opposite the first surface, with a first fluid;

circulating a second fluid, separate from the first, through said closed cavity between an inlet and an outlet of this cavity; and analysing the fluid extracted via said outlet of the cavity to detect the possible presence of the first fluid.

Using this principle, the presence of the first fluid in the fluid extracted from the closed cavity indicates that it has passed through the electrolyte, and therefore reveals lack of imperviousness thereof due to the existence of defects such as cracks for example. With the invention it is also possible, in the event of detection of a break in the seal of the electrolyte, to quantify the extent of the leak as a function of the quantity of first fluid detected in the mixture with the second fluid.

The method of the invention is advantageous in that it is easy to implement, and does not require the use of high fluid pressures. The risks of deteriorating the part are thereby reduced to zero, which allows this method to be qualified as non-destructive.

The tested part may be the electrolyte alone or else the electrochemical cell comprising this electrolyte i.e. the electrolyte contained between the anode and cathode.

The method of the invention is preferably carried out after the manufacture and before the first use of the electrolyte, but it can also be performed one or several times throughout the lifetime of this electrolyte.

Preferably, the first and second fluids are gases. This is particularly the case when the fuel and oxidizer of the associated electrochemical cell are also intended to be gaseous. On the other hand, if the tested electrolyte is intended to be integrated within a cell whose fuel and/or oxidizer is liquid, then the first and second fluids may be liquids, or else gases.

Preferably, the first gas is oxygen gas contained in the ambient air in contact with the second outer surface of the part. This allows extremely simple implementation of the method.

Preferably the second gas is nitrogen gas or any other neutral gas such as helium.

It is to be noted that the first and second gases may each and/or either be a mixture of different gaseous components. If at least one of the gaseous components is present in both mixtures, to determine whether the first mixture has entered the closed cavity with the second mixture, it is then sufficient for example to detect the content of said common gaseous component in the fluid extracted from the closed cavity, and to compare this with the initial content of said common gaseous component in the second mixture.

Preferably, the detection of the possible presence of the first fluid is carried out using a trace analyser of this first fluid, which may be an electrochemical probe for example. With this technique it is possible to obtain a precise measurement of the quantity of oxygen gas present in the gas mixture, and it is therefore fully suitable for example if the first gas is the oxygen gas in ambient air and the second gas is nitrogen gas.

In addition, from the analysis of the fluid extracted from said closed cavity, the rate of leakage of the tested part is preferably determined which directly provides information on the extent of seal integrity.

Preferably the second fluid enters the closed cavity at a pressure of the order of a few millibars. This low pressure does not generate any risk of rupture of the tested part, which is not weakened either by the atmospheric pressure of the air applied onto the first surface of this part. Additionally, it does not set up any reverse gas flow which could oppose the passive diffusion of the first gas through the defects of the part to be tested.

It is pointed out that the method can be implemented at any temperature deemed to be appropriate by the person skilled in the art, in particular at ambient temperature.

Finally, preferably said closed cavity is delimited by a bottom provided with a recess separated from the remainder of the cavity by a grid, and said inlet opens into the recess and said outlet leads to the grid.

Other advantages and characteristics of the invention will become apparent from the non-limiting, detailed description given below.

BRIEF DESCRIPTION OF THE DRAWINGS

This description will be made with reference to the single FIGURE illustrating a schematic view of the installation allowing the implementation of the seal testing method according to one preferred embodiment of the present invention.

DETAILED DESCRIPTION OF PREFERRED EMBODIMENTS

The invention which is described below in the form of one preferred embodiment consists of conducting a non-destructive method for testing the seal of an electrolyte of an electrochemical cell, before it is stacked with tens even hundreds of other cells inside a fuel cell or an electrolysis cell. Preferably, the method is conducted on a part forming an entire SOFC/SOEC electrochemical cell i.e. comprising the electrolyte contained between the anode and cathode.

On this type of cell for example of square shape with sides of about 20 cm, the electrolyte is of narrow thickness of the order of 5 to 10 µm. Alternatively, for an electrolyte supported cell, the thickness of the electrolyte may be a few tens of micrometers. It is formed of yttrium zirconium whilst the anode is formed of a metallic ceramic in which nickel is dispersed, and the cathode is formed of a perovskite.

The objective of the method is to detect in simple and reliable manner any sealing defects of the electrolyte which may be in the form of manufacturing problems such as cracks for example likely to allow the fuel and oxidizer gases to escape from this electrolyte.

To implement the method an installation 1 is provided shown in the single FIGURE, comprising a frame 2 in the form of a substantially parallelepiped container open at the top. The part to be tested i.e. the electrochemical cell 4 is placed in the container 2 horizontally and parallel to the bottom 6 of this container. A sealing gasket 8 is placed between the bottom 6 and the cell 4, this gasket following the contour of the cell. Typically, the gasket 8 has a thickness of the order of 2 mm e.g. from 1 to 4 mm.

In addition, the upper part of the container is covered by an openwork lid 10 e.g. cross-shaped whose ends are retained by the side walls of the container. This lid 10 is provided with clamping means here comprising one or more vertical screws 12 bearing against a clamping plate 14 also of openwork type. Another sealing gasket 16 is positioned between the clamping plate 14 and the cell 4, this gasket also following the contour of the cell.

The tightening of the screw 12 allows the two sealing gaskets 8, 16 to be placed under pressure between the plate 14 and the bottom 6 of the container. Typically, clamping is of the order of 10 $N.m^{-1}$, to guarantee sufficient imperviousness at the seals without damaging the part however which is of narrow thickness of between a few micrometers, for example 60 micrometers, and 500 micrometers, preferably of the order of 80 to 200 micrometers. Quantification of the clamping provides for the reproducibility and homogeneous application thereof from one part to another.

With this installation, a closed cavity 18 is delimited by the bottom 6, the gasket 8 and a first outer surface of cell 4, namely the underside surface 20 of the electrochemical cell.

The bottom 6 can be provided with a recess 22 separated from the remainder of the cavity 18 by a grid 24 forming a diffuser, ensuring efficient distribution and hence efficient mixing and renewing of the gases in the cavity 18.

The cavity 18 is designed to be flushed with neutral gas preferably nitrogen gas, circulating between an inlet 26 and an outlet 28 both made through the bottom 6. As can be seen in the FIGURE the inlet 26 opens out into the recess 22 whilst the outlet 28 leads to the grid 24. In other words the outlet 28, after passing through the bottom 6, assumes the form of a pipe set in the grid 24.

Preferably the cavity 18 is of small volume for example between 100 and 600 $cm^3$, preferably of the order of 200 to 300 $cm^3$. The inlet 26 is connected to the nitrogen gas feed means 30, such as a cylinder of nitrogen gas, via a flow rate and pressure regulating valve 32. By way of an illustrative example, the valve is driven so as to deliver a flow rate of nitrogen gas of the order of 100 ml/min, at a pressure in the region of 10 to 100 mbars, preferably 10 to 50 mbars. The outlet 28 is connected to a trace analyser 34, preferably in the form of an electrochemical probe, whose function is explained below.

As previously described, the outlet 28 is set in the grid 24 hence as close as possible to the part 4 to be tested, the objective being to recover a flushing gas having the highest probability of containing oxygen gas.

On the other side of the cell, the cell has a second outer surface 40 opposite to the first, also called a top surface. Evidently, the underside 20 and top 40 surfaces are respectively located at the anode and cathode of the cell 4, or conversely.

This second surface 40 is in contact with ambient air and therefore has a temperature in the region of 20 to 25° C. and under atmospheric pressure. This ambient air passes easily through the lid 10 and clamping plate 14 as schematically illustrated by the upper arrows in the FIGURE. In particular the top surface 40 is in contact with the oxygen gas contained in ambient air, its content being in the region of 21%. This oxygen gas, called the first gas carries an essential "trace" function, since it is the presence thereof in the closed cavity 18 which is to be identified by means of the analyser 34.

For the implementation of the method, the flushing with nitrogen gas, called the second gas, is conducted through the closed cavity 18, between the inlet 26 and the outlet 28. Preferably, provision is made for a purge time of a few minutes e.g. 2 to 10 minutes depending on the applied flow rate, for the purpose of removing any residual oxygen from the cavity 18 and before measuring leakage of the first gas. The analyser 34 is capable, preferably in real time and continuously, of determining the measurement of the quantity of oxygen gas leaving the cavity 18, in ppm, and within a short time for example within only a few minutes. Therefore on the basis of this measurement, it is possible to know whether oxygen gas from ambient air has or has not entered into the cavity 18 transiting via the electrolyte of the cell 4, depending on whether the gas analysed at the outlet of this cavity is formed of a mixture of the first and second gases or solely of the second flushing gas. In the first case in which oxygen gas is detected by the analyser 34, this translates the presence of a faulty seal of the electrolyte which it is possible to quantify via the leakage rate delivered by a converter 40 based on the number of ppm of oxygen gas measured by the analyser 34.

As an illustrative example, if there is a sealing defect of the electrolyte, even a minor defect, the detected leak level is of the order of $4.10^{-3}$ mbar.l/s, or higher. This value contrasts with the value obtained when the electrolyte has a perfect seal which is of the order of $6.10^{-6}$ mbar.l/s, resulting from the initial negligible quantity of oxygen gas in the in the nitrogen gas cylinder 30.

Evidently, various modifications can be made by the person skilled in the art to the invention which has just been described in non-limiting examples.

The invention claimed is:
1. A method for testing a seal of a part including an electrolyte of an electrochemical cell, the method comprising:
   forming a closed cavity delimited by a first outer surface of the part including the electrolyte to be tested;
   contacting a second outer surface of the part, opposite the first surface, with a first fluid;

circulating a second fluid, separate from the first fluid, through the closed cavity between an inlet and an outlet of the cavity; and analyzing a fluid extracted via the outlet of the cavity, to detect a possible presence of the first fluid, wherein the first fluid contacts the second outer surface of the part and the first fluid passes through the seal of the part into the part when the seal is faulty and then the first fluid passes into the closed cavity.

2. The method according to claim 1, wherein the detection of the possible presence of the first fluid is conducted using a trace analyzer of the first fluid.

3. The method according to claim 1, wherein a leak rate of the tested part is determined based on analysis of the fluid extracted from the closed cavity.

4. The method according to claim 1, wherein the second fluid enters the closed cavity at a pressure of an order of 10 to 50 mbars.

5. The method according to claim 1, wherein the part is the electrolyte alone, or the electrochemical cell containing this electrolyte.

6. The method according to claim 1, wherein the closed cavity is delimited by a bottom provided with a recess separated from a remainder of the cavity by a grid, and wherein the inlet opens into the recess and the outlet leads to the grid.

7. The method according to claim 1, further comprising flushing the closed cavity with the second fluid to purge the closed cavity of residual first fluid before analyzing the fluid extracted via the outlet of the cavity, to detect a possible presence of the first fluid.

8. The method according to claim 1, wherein the volume of the closed cavity is between 100 and 600 $cm^3$.

9. The method according to claim 1, wherein the first and second fluids are gases.

10. The method according to claim 9, wherein the second fluid is nitrogen gas.

11. The method according to claim 9, wherein the first fluid is oxygen gas contained in ambient air in contact with the second outer surface of the part.

12. The method according to claim 11, wherein the ambient air is under atmospheric pressure.

* * * * *